United States Patent [19]

Grafe et al.

[11] Patent Number: 4,709,367
[45] Date of Patent: Nov. 24, 1987

[54] METHOD AND APPARATUS FOR DISTINGUISHING BETWEEN DISKETTES IN A DISKETTE DRIVE

[75] Inventors: Robert J. Grafe; Steven T. Pancoast, both of Austin, Tex.

[73] Assignee: International Business Machines Corporation, Armonk, N.Y.

[21] Appl. No.: 846,340

[22] Filed: Mar. 31, 1986

[51] Int. Cl.⁴ .......................... G06F 11/10; G11B 5/02
[52] U.S. Cl. ........................................ 371/38; 360/53; 360/60
[58] Field of Search ....................... 371/37, 38, 39, 40; 360/60, 53; 369/83, 84

[56] References Cited

U.S. PATENT DOCUMENTS

| | | | |
|---|---|---|---|
| 4,380,029 | 4/1983 | Bode | 360/53 X |
| 4,562,577 | 12/1985 | Glover et al. | 371/38 |
| 4,577,289 | 3/1986 | Comerford et al. | 360/60 X |
| 4,578,722 | 3/1986 | Lovgren et al. | 360/60 |
| 4,622,598 | 11/1986 | Doi et al. | 371/39 X |
| 4,637,023 | 1/1987 | Lounsbury et al. | 371/38 |
| 4,644,545 | 2/1987 | Gershenson | 371/38 |

OTHER PUBLICATIONS

IBM Technical Disclosure Bulletin, vol. 28, No. 2, Jul., 1985, "Diagnostic Technique for Use in Disk Drive Controllers", pp. 739–740.
Waddell, IBM Technical Disclosure Bulletin, vol. 27, No. 6, Nov., 1984, pp. 3580–3581, "Forcing CRC Errors on Diskettes".

Primary Examiner—Charles E. Atkinson
Attorney, Agent, or Firm—J. F. Villella, Jr.

[57] ABSTRACT

A method and apparatus are disclosed for enabling a diskette drive system to distinguish between diskettes and verify that the diskette currently in the drive is the correct one. Each diskette contains a file allocation table for controlling the allocation and deallocation of storage space on the diskette. Each time that the file allocation table on a diskette is accessed, i.e., read or written, a cyclic redundancy check (CRC) value for the file allocation table is calculated and stored. When checking the validity of a diskette, i.e., that the correct diskette is in the drive, a CRC value for the file allocation table of the currently loaded diskette is calculated and compared to the most recently stored CRC value. If the most recently calculated CRC value does not match the most recently stored CRC value, then this is an indication that the wrong diskette is currently in the diskette drive. A warning is then provided to the system user to change diskettes before a read or a write operation will be commenced.

12 Claims, 6 Drawing Figures

METHOD AND APPARATUS FOR DISTINGUISHING BETWEEN DISKETTES IN A DISKETTE DRIVE

TECHNICAL FIELD

This invention relates to a diskette drive system, and more particularly, to one having the capability to distinguish between diskettes in the system.

BACKGROUND ART

One form of storage used in information processing systems is a diskette drive system. The use of a diskette drive system is especially prevalent in smaller computers such as personal computers. Information in the form of application programs and data can be stored on a diskette and accessed using the diskette drive system. Information can be both read from or written on the diskette in the diskette drive system.

A problem that can arise in a diskette based storage system is the inadvertent destruction or loss of information on a diskette. Such a loss can occur in a number of ways. For example, assume that a user is running application program XYZ that has a opened data file on the XYZ diskette. Assume further that the user then decides to suspend the execution of application XYZ and to run application ABC which is on another diskette. In one situation, if the user removes the XYZ diskette and then inserts the ABC diskette before suspending the application XYZ, then the ABC diskette will be destroyed. This will occur because information from the XYZ diskette including the data from the opened data file on the XYZ diskette will be written on the ABC diskette. In another scenario, if the user suspends the execution of application XYZ, switches diskettes and runs application ABC before resuming application XYZ, and then forgets to reinsert diskette XYZ, then the contents of the opened data file on the XYZ diskette may be lost.

The destruction and/or loss of data can also occur while running a single application program. For example, if the application is entirely on one diskette while the data used with the application is on a second diskette, then the possibility of inadvertently writing data on the application diskette exists. This possibility increases if the application is on more than one diskette and data is contained on at least one of the diskettes on which the application is written. As the user is required to change diskettes in a drive in order to execute a single application program and to record the data attendant with the execution of such application program, then the probability of inadvertently writing on the wrong diskette increases.

One known alternative for coping with the diskette destruction problem is to write a diskette identifying code in each sector on a diskette. This diskette identifying code can then be read from any track on the diskette and used to log the occurrence of insertion or removal of the diskette to and from the diskette drive. The diskette identifying code can then be read from any accessed track prior to a write operation in order to prevent erroneously writing on the wrong diskette. A drawback of this approach is that it requires extra space on the diskette which can no longer be used for either an application program or for data. Additionally, this technique increases the access time to a diskette because the diskette identifying code must be written in each new sector on diskette and then read prior to a write operation. An example of such a technique is found in in commonly assigned U.S. Pat. No. 4,578,722.

It would be most desirable to provide a technique for distinguishing between diskettes in a diskette drive using the information contained on a diskette without the need for additional identifying labels or codes. It would also be most desirable to provide the user of a diskette drive system with a warning that the wrong diskette is presently in the diskette drive. In this manner, the problem of inadvertent loss or destruction of information on a diskette, either application program or data, would be substantially eliminated.

DISCLOSURE OF THE INVENTION

It is an object of this invention to provide an improved diskette drive system.

It is another object of this invention to provide an apparatus and method for distinguishing between diskettes in a diskette drive system.

It is still a further object of this invention to provide a method and apparatus for warning the user of a diskette drive system that the wrong diskette is in the drive.

In accordance with these and other objects of the invention, a method and apparatus are provided for distinguishing between diskettes in diskette drive system and warning the user of such a system when the wrong diskette is in the drive. In this manner, the inadvertent loss and/or destruction of information on a diskette is subsequently eliminated. Each diskette used in a diskette drive contains at least one file allocation table for controlling the allocation and deallocation of memory space on the diskette. The file allocation tables are located immediately after the boot sector of a diskette. Each time that the file allocation table on a diskette is accessed, i.e., a read or write operation is performed, a cyclic redundancy check (CRC) of the accessed file allocation table is calculated and stored. At the time of checking the validity of a diskette, the CRC for such diskette is calculated and compared to the most recently stored CRC value for the diskette drive. The most recently stored CRC value will be the one which has been calculated at the time of the last storage access for the drive, i.e., at the time of the last read or write operation. If the two CRCs do not match, then this is an indication that the wrong diskette is presently in the diskette drive. The user of the diskette drive system is then prompted to change diskettes prior to the next storage access operation. This warning is given by the information processing system on which the diskette drive system is operating in the form of an audio or visual warning.

BEST MODE FOR CARRYING OUT THE INVENTION

Figure 6:
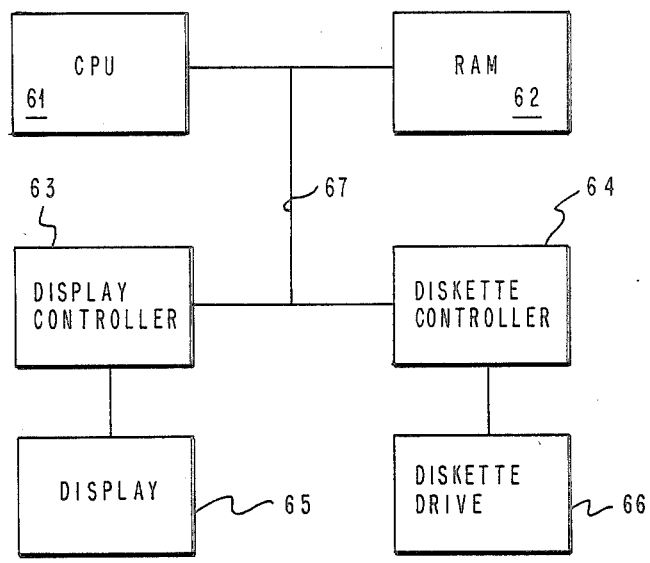
FIG. 6 is a functional block diagram of the system according to the present invention.

The information processing system of the invention is shown in FIG. 6. Communication among CPU 61, RAM 62, display controller 63, and diskette controller 64 takes place over bus 67. Diskette controller 64 provides an interface between diskette drive 66 and bus 67 and controls the operation of diskette drive 66. While only a single diskette drive is shown in FIG. 6, several diskette drives may be interfaced with diskette controller 64. Similarly, display controller 63 functions as an interface between display 65 and bus 67 and controls the operation of display 65.

In operation, a diskette is inserted into diskette drive 66 thereby enabling information to be read from and/or written to the inserted diskette. When a diskette is first inserted into drive 66, the information contained thereon is loaded into RAM 62 for use during the operation of the system shown in FIG. 6. This information may be in the form of either application programs or data. The loading of information from a diskette in a disk drive into the working memory of an information processing system is well known in the prior art and will not be discussed further herein.

In the preferred embodiment disclosed herein, a visual warning is provided on display 65 when a wrong diskette is inserted into diskette drive 66. Such warning prompts the user of the information processing system of FIG. 6 to remove the diskette that is in diskette drive 66 and to insert the correct diskette. The details of how the system of FIG. 6 distinguishes between the diskettes in diskette drive 66 will now be explained in more detail with reference to FIGS. 1-5.

Figure 1:
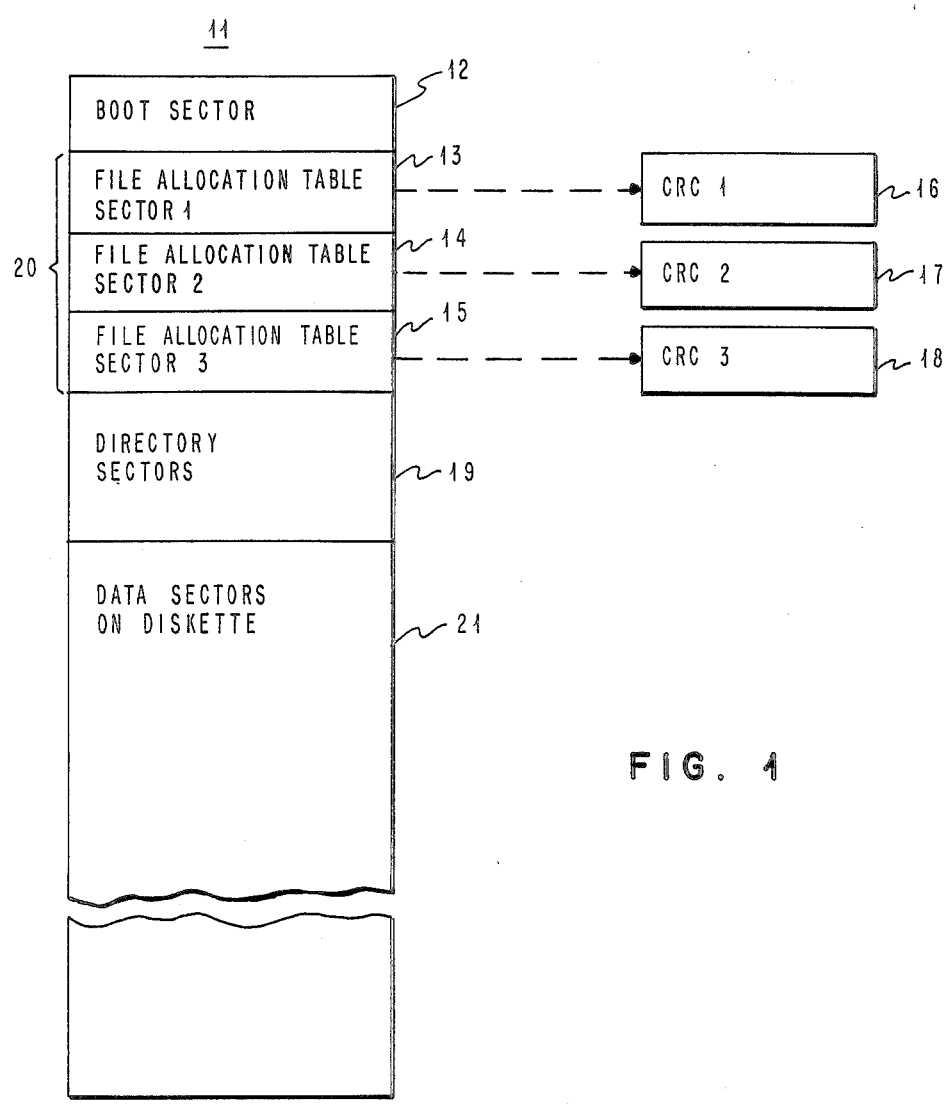
FIG. 1 is a schematic diagram of storage space on a diskette.

The arrangement of sectors on diskette 11 is depicted in FIG. 1. Boot sector 12 contains the logical description of the layout of diskette 11. The information contained in boot sector 12 indicates the following information: the number of sides of diskette 11; the number of tracks on a side; the number of sectors per track; the number of file allocation tables on diskette 11; the size of a file allocation table; and, the number of directories and their size. In the preferred embodiment disclosed herein, there are two sides to diskette 11 with 80 tracks and 9 sectors per track, thereby providing a total of 1,440 sectors. The sectors on diskette 11 are further arranged into groups forming a cluster. Typically, there are at least two sectors per cluster.

As can be seen in FIG. 1, file allocation table 20 comprises three sectors 13, 14, and 15. These three sectors are respectively designated as sector 1, sector 2 and sector 3. Additionally, diskette 11 contains directory sectors 19 and data sectors 21. A cyclic redundancy check (CRC) value is generated for each of sectors 13-15 of file allocation table 20 and is represented by blocks 16-18 respectively. Each of CRC 1-CRC 3, i.e., blocks 16-18, represent 16 bits. These three 16 bit CRC values form a 6 byte (8 bits per byte) CRC vector which is used to uniquely identify diskette 11. The identification of diskette 11 using CRC values 16-18 will be explained in more detail hereinafter with respect to FIGS. 2-5.

Before any file on diskette 11 is either read or written, the file must be opened. When a file is opened, the name of such file is added to the directory (herein shown as directory sectors 19), the length of the file is set to 0 and a cluster pointer is allocated. When the file is closed, the directory is updated. This close operation insures that all data is actually written to diskette 11 and not merely held in an internal buffer (not shown). This latter operation could occur in an operating system wherein data is held in a internal buffer until the buffer is needed for another operation or until the file is closed.

The information processing system of FIG. 6 may be embodied in a personal computer using a disk operating system (DOS). As is well known, DOS is the operating system typically used to control the operation of a personal computer such as the information processing system depicted in FIG. 6. An important part of DOS is the basic input/output system (BIOS) which typically is stored in a non-eraseable portion of memory in a personal computer. BIOS controls the reading and writing of information on a diskette in diskette drive 66. The operation of DOS and BIOS in a personal computer to control a diskette drive is explained more thoroughly in a book entitled Inside the IBM PC by P. Norton, published in 1983 by Robert J. Brady Company and which is hereby incorporated by reference. The operation of DOS and BIOS is not considered essential to the present invention and will not be explained in further detail hereinafter.

DOS groups the sectors of storage on diskette 11 into clusters of two or more sectors of information. The clusters on diskette 11 are represented in file allocation table 20. File allocation table 20 contains sectors 1, 2 and 3, represented by blocks 13, 14, and 15, respectively. File allocation table 20 controls the automatic allocation and deallocation of storage space on diskette 11 and as seen in FIG. 1 is located immediately after boot sector 12. As is well known, boot sector 12 performs the function of loading the information on diskette 11 into RAM 62 whenever diskette 11 is loaded into diskette drive 66.

To form a file on diskette 11, these clusters are chained together in file allocation table 20 to allocate the clusters required to store the file. The file allocation table 20 on diskette 11 represents the number of files on the diskette, i.e., the number of chains, the size of each file, i.e., the length of each chain, and, the manner in which a file was created, i.e., the unique representation of the chain for that file.

While an application program is executing on the information processing system of FIG. 6, any access to sectors 13, 14, and 15 containing file allocation table 20 is monitored. Whenever these sectors 13-15 are accessed, i.e., read or written, a cyclic redundancy check (CRC) for each one of sectors 13-15 of file allocation table 20 is calculated and stored in RAM 62. When a user attempts to suspend the execution of an application that has one or more open files on diskette 11, then the CRC of sectors 13-15 of file allocation table 20 are calculated and compared to the ones that have most recently been stored in RAM 62. If there is not a match, then the user is instructed to reinsert the previously used diskette in drive 66 prior to proceeding with either a read or write operation. Such warning is provided on display 65.

Figure 2:
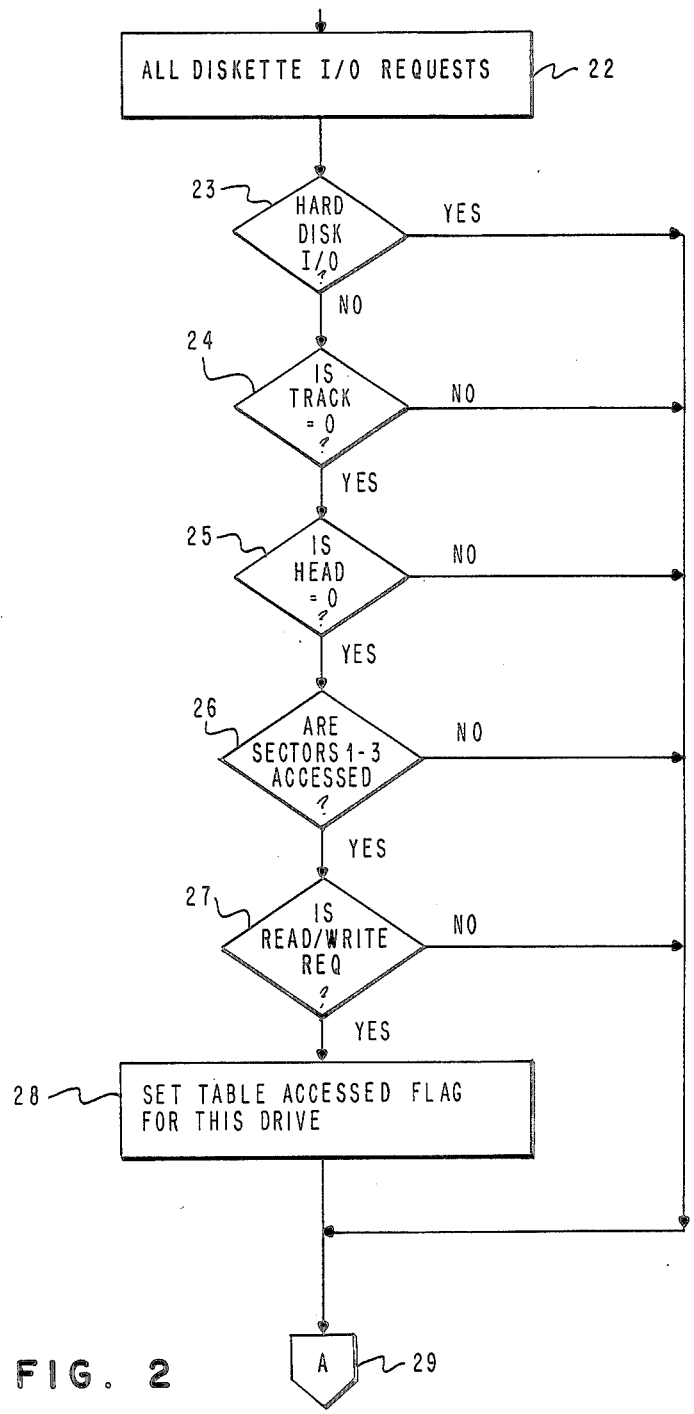
FIGS. 2 and 3 are flow charts of normal diskette I/O processing.

A normal diskette I/O processing function will now be explained in more detail with respect to FIGS. 2 and 3. As indicated in block 22, all diskette I/O requests are input to diskette controller 64. Following block 22 are a series of decision blocks 23-27. If the answer to decision block 23 is yes or if the answers to any one of decision blocks 24-27 is no, then operation proceeds to step 29. Following step 29, the requested I/O processing function is initiated as shown in block 31.

However, if the above enumerated answers to decision blocks 23-27 does not occur, then I/O processing proceeds as follows. First, in decision block 23, a determination is made as to whether or not a hard disk I/O operation is to occur. An affirmative answer to this indicative that an access to a diskette in diskette drive 66 will not occur at that time. Since the user of the information processing system shown in FIG. 6 does not have the problem of destroying data on a diskette when using a hard disk file, there is no need to perform the CRC comparison function disclosed herein to prevent destruction and/or loss of data on a diskette. Consequently, the hard disk I/O operation is allowed to proceed. Recall that the problem of inadvertently destroying or losing data in a diskette drive system applies only to a diskette which can be put in and taken from diskette drive 66.

After determination that the I/O function to be performed will be done on a diskette, then a determination is made in block 24 as to whether or not track 0 on the diskette will be accessed. If the answer is yes, then a determination is made in decision block 25 as to whether or not the accessed head is equal to 0, i.e., whether or not side 1 of the diskette is to be accessed. If the answer to decision block 25 is yes, then a determination is made in block 26 as to whether or not sectors 1-3 are to be accessed, i.e., whether or not file allocation table 20 and specifically, sectors 13, 14 or 15 (see FIG. 1) are to be accessed. If the answer to decision block 26 is yes, that is, the file allocation table 20 is to be accessed, then a determination is made in decision block 27 as to whether or not a read or write operation is to be performed. If a read or write operation is to be performed, then as indicated in block 28, a flag is set for diskette drive 66 indicating that file allocation table 20 is to be accessed.

Figure 3:
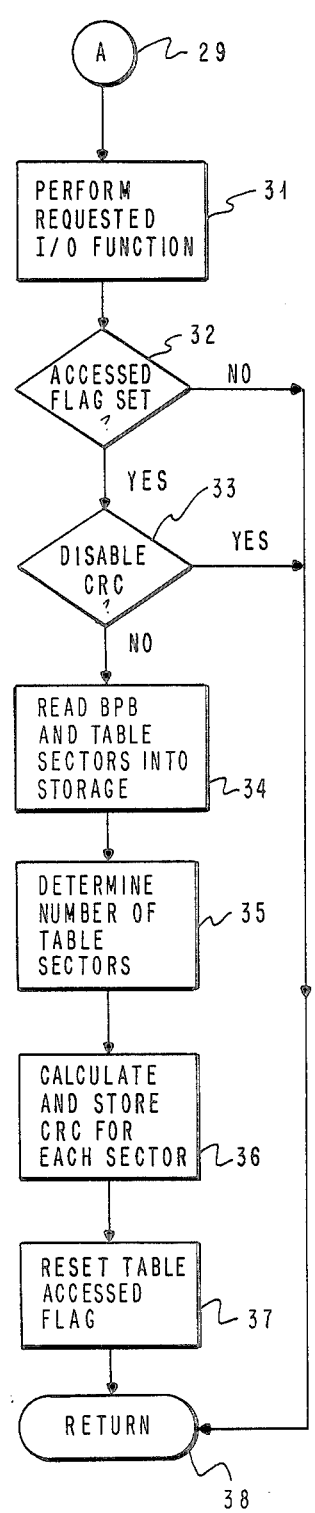

Normal I/O processing then continues to block 31 of FIG. 3 wherein a BIOS interrupt is called to perform the requested I/O function. A determination is first made in decision block 32 as to whether or not a file allocation table access flag has been set for the diskette drive being used. If the answer is no, then operation proceeds to block 38 wherein access to diskette drive 66 ceases and the system of FIG. 6 is free for the next I/O operation. However, if an accessed flag has been set for file allocation table 20, then a second decision block 33 is reached. In decision block 33, a determination is made as to whether or not the cyclic redundancy check function has been disabled for the diskette drive. If the answer is yes, then once again processing proceeds to block 38. However, if the answer to decision block 33 is no, then as indicated in block 34 the BIOS parameter block (BPB) also known as boot sector 12 and file allocation table 20 sectors 13-15 are read into RAM 62. Subsequently, in block 35 a determinaton is made as to the number of sectors in file allocation table 20 that are to be accessed. After this determination is made, a CRC value for each accessed one of sectors 13-15 in file allocation table 20 is calculated and stored for this accessed diskette drive. This is shown in block 36. Finally, as indicated in block 37, the accessed flag for this diskette drive indicating that file allocation table 20 has been accessed is then reset and processing continues to block 38.

Figure 4:
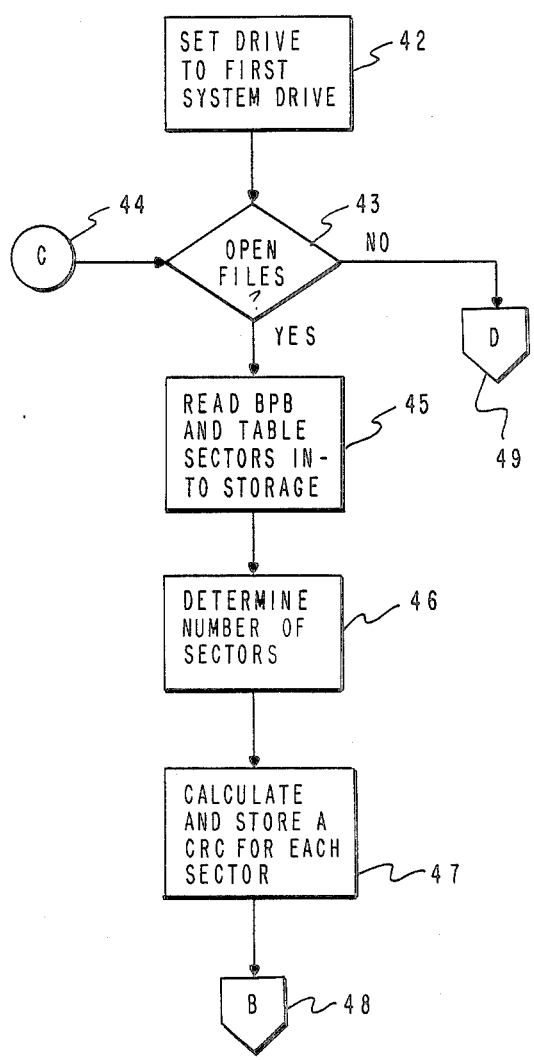
FIGS. 4 and 5 are flow charts of suspend request processing according to the present invention.
Figure 5:
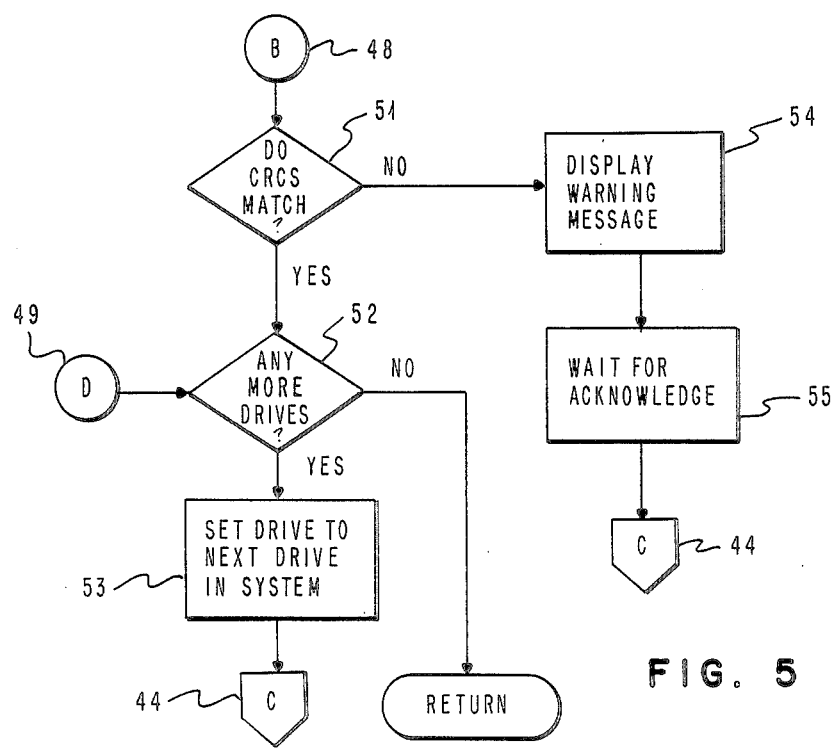

Diskette I/O processing at the time an executing application is suspended will now be explained with reference to FIGS. 4 and 5. Recall that during a suspend operation, an executing application program is halted and normally a second application program is begun. This procedure entails removing the diskette in diskette drive 66 and inserting a second diskette containing the second application program into diskette drive 66. At this time, it is very critical that the user have the correct diskette in diskette drive 66 prior to a diskette access operation. Failure to have the proper diskette in diskette drive 66 will result in the inadvertent loss and/or destruction of data on the diskette.

In step 42, diskette drive 66 is treated as the first drive in the system. Recall that while only diskette drive 66 is shown in FIG. 6, the information processing system of FIG. 6 may contain more than one diskette drive. Next, in step 43, a determination is made as to whether or not there are any open files on the diskette in this first drive. If the answer is no, then processing proceeds to step 49 (see FIG. 5 to be explained in more detail hereinafter). However, if the answer to block 43 is yes, then both boot sector 12 and sectors 13-15 of file allocation table 20 are read into RAM 62 as shown in step 45. Subsequently in step 46, a determination is made as to the number of file allocation table sectors that exist for this particular diskette, i.e., whether or not there are one, two or three file allocation table sectors for this diskette. Finally, in step 47 a CRC value is calculated for each one of the sectors in file allocation table 20 used by the inserted diskette and the CRC values are temporarily stored in a 6 byte CRC vector which uniquely identifies the diskette currently loaded in diskette drive 66.

After the calculated CRC value is temporarily stored, it is compared to the previously stored CRC vector for the operative diskette drive as indicated in step 51. If the two CRC values do not match, then as indicated in step 54, a display message is provided to the system user that the incorrect diskette is in the drive and subsequently in step 55, no processing proceeds until the user acknowledges the warning message. After the user has acknowledged in step 55, then processing proceeds to step 44 and the CRC comparison process continues beginning with step 43. The comparison and warning process continues until the user inserts the correct diskette into the diskette drive.

If the answer to decision block 51 is yes, i.e., the two CRC values match, then a determination is made in block 52 as to whether or not any more drives are being accessed in the system. If the answer is no, then a return is made and processing continues. However, if there are other drives in the system being accessed, then as indicated in step 53 the drive to be checked for a correct diskette is then set to be the next drive in the system and the CRC matching process continues in step 43 of FIG. 4.

While the preferred embodiment disclosed herein describes how to prevent inadvertent destruction/loss of diskette information when suspending a first application, running a second application, and then resuming the first application, the technique disclosed applies equally well to a situation where a user is running an application which requires more than one diskette to be used during the execution of the program. For example, a number of application programs currently available to personal computer users have the applications written on two or more diskettes. This requires that the user at various times during the execution of the application program change diskettes when using a single diskette drive system. The changing of diskettes can also be required in a two diskette drive system if one of the diskette drives is dedicated to a diskette containing data to be used with or generated by the application program. Consequently, the possibility of inadvertently destroying or losing data on one or more of the application program diskettes is a distinct possibility.

To prevent such an occurrence, the present invention can be used to check for any open files on a diskette in a diskette drive prior to a write operation. If there are any open files on a diskette to which a write request has been made, then the CRC comparison technique disclosed hereinbefore may be used. Using this technique, a CRC value for the file allocation table 20 on a diskette in the drive 66 will be calculated when the file allocation table 60 is accessed. The CRC value is then stored in RAM 62. Prior to the next write operation on that diskette, a second CRC value is calculated for the diskette and compared to the most recently stored value in RAM 62. If the two values do not match, then a display warning is given to the user over display 65 to prompt the user to insert the correct diskette in diskette drive 66. The CRC checking operation for such a situation can proceed along the lines shown in FIGS. 4 and 5 as previously discussed.

While the invention has been particularly shown and described with reference to a preferred embodiment, it will be understood by those skilled in the art that various other changes in form and detail may be made without departing from the spirit and scope of the invention.

What is claimed is:

1. A method for distinguishing between diskettes in a diskette drive system, wherein each diskette contains a unique file allocation table, said method comprising:

calculating and storing a CRC value for the file allocation table on a diskette each time the file allocation table is accessed;

comparing each calculated CRC value to the most recently stored CRC value; and, providing a warning when a calculated CRC value is not equal to the most recently stored CRC value.

2. A method according to claim 1 further comprising determining the number of sectors in said file allocation table.

3. A method according to claim 2 further comprising calculating a CRC value for each sector in said file allocation table.

4. A method according to claim 3 further comprising generating a CRC vector from the CRC value calculated for each and every sector in said file allocation table.

5. A method according to claim 1 further comprising setting a file allocation table access flag each time said file allocation table is accessed.

6. A method according to claim 5 further comprising resetting said flag subsequent to calculating and storing the CRC value for the file allocation table.

7. In an information processing system, including a disk drive system for storing information on diskette wherein each diskette contains a unique file allocation table, a method for suspending system execution without loss or destruction of diskette information, comprising:

calculating and storing a CRC value for the file allocation table on a diskette each time the file allocation table on the diskette is accessed;

calculating a CRC value for the file allocation table on the diskette in said disk drive system at the time of suspending system execution;

comparing the CRC value calculated at the time of suspending system execution to the most recently stored CRC value; and, providing a warning when the calculated CRC value is not equal to the most recently stored CRC value.

8. A method according to claim 7 further comprising, determining the number of sectors in the file allocation table on a diskette prior to calculating a CRC value for such file allocation table.

9. A method according to claim 8 further comprising calculating a CRC value for each one of such sectors determined.

10. A method according to claim 7 further comprising checking for open files on the diskette in said disk drive system at the time of suspending system execution prior to calculating a CRC value for the file allocation table on such diskette.

11. In an information processing system, including a disk drive system for storing information on diskette wherein each diskette contains a unique file allocation table, diskette distinguishing apparatus, comprising:

means for calculating a CRC value for the file allocation table on a diskette each time the file allocation table is accessed;

means for storing said CRC value;

means for comparing the most recently calculated CRC value to the most recently stored CRC value; and, means for providing a warning when the most recently calculated CRC value is not equal to the most recently store CRV value.

12. In an information processing system, including a disk drive system for storing information on diskette wherein each diskette contains a unique file allocation table, apparatus for suspending the information processing system, comprising:

means for calculating a CRC value for the file allocation table on a diskette each time the file allocation table is accessed;

means for storing said CRC value;

means for calculating a CRC value for the file allocation table on the diskette in said disk drive system at the time of suspending said information processing system;

means for comparing the most recently stored CRC value to the CRC value calculated at the time of suspending said information processing system; and, means for providing a warning when the most recently stored CRC value is not equal to the CRC value calculated at the time of suspending said information processing system.

* * * * *

UNITED STATES PATENT AND TRADEMARK OFFICE
CERTIFICATE OF CORRECTION

PATENT NO. : 4,709,367

DATED : November 24, 1987

INVENTOR(S) : R. J. Grafe and S. T. Pancoast

It is certified that error appears in the above-identified patent and that said Letters Patent is hereby corrected as shown below:

Column 8, line 37, "store CRV" should read --stored CRC--.

Signed and Sealed this

Twenty-first Day of November, 1989

Attest:

JEFFREY M. SAMUELS

Attesting Officer     Acting Commissioner of Patents and Trademarks